United States Patent
Aliffi et al.

(10) Patent No.: US 7,536,346 B2
(45) Date of Patent: May 19, 2009

(54) SYSTEM AND METHOD FOR FACILITATING RECIPROCATIVE SMALL BUSINESS FINANCIAL INFORMATION EXCHANGES

(75) Inventors: Patrick A. Aliffi, Cumming, GA (US); Barbara Jo Ellison, Alpharetta, GA (US); Nader Mir, Alpharetta, GA (US); Frank D. Brewer, Jr., Roswell, GA (US)

(73) Assignee: Equifax, Inc., Atlanta, GA (US)

( * ) Notice: Subject to any disclaimer, the term of this patent is extended or adjusted under 35 U.S.C. 154(b) by 795 days.

(21) Appl. No.: 10/021,468

(22) Filed: Oct. 29, 2001

(65) Prior Publication Data

US 2003/0083893 A1 May 1, 2003

(51) Int. Cl.
*G06Q 40/00* (2006.01)

(52) U.S. Cl. ................ 705/38; 705/3; 705/10; 705/37; 709/200; 709/217; 707/1

(58) Field of Classification Search .......... 705/38, 705/51
See application file for complete search history.

(56) References Cited

U.S. PATENT DOCUMENTS 4,764,666 A * 8/1988 Bergeron ............... 463/25

(Continued)

FOREIGN PATENT DOCUMENTS

| CA | 2 312 641 A1 | 12/2000 |
| WO | WO 99/56495 | 11/1999 |
| WO | WO 00/25251 | 5/2000 |

(Continued)

OTHER PUBLICATIONS

Horne, et al., "Escrow Services and Incentives in Peer-To-Peer Networks," *BNS*, pp. 1-10 (2110) Abstract No. XP-002248537.

(Continued)

*Primary Examiner*—Andrew J. Fischer
*Assistant Examiner*—Mamon Obeid
(74) *Attorney, Agent, or Firm*—Kilpatrick Stockton LLP

(57) ABSTRACT

Systems and methods facilitate information sharing among a plurality of member institutions. Each member is associated with a member number and a corresponding member profile. A member contributes its data relating to small business entities to an exchange repository upon becoming a member, and thereafter on a periodic basis. Each member is eligible to query against the exchange repository. However, a response to a member's inquiry is determined by a reciprocity due to the inquiring member. If a member contributes comprehensive information regarding small business entities in its portfolio, then the member receives comprehensive information relating to a small business entity that becomes a subject of its inquiry. If a member contributes minimal information regarding the small business entities in its portfolio, the member receives minimal information relating to a small business entity that becomes a subject of its inquiry, regardless of the amount of information available in the exchange repository. Each business entity regarding which information is stored in the exchange repository is associated with a business entity identifier. A business entity identifier associates a record file for the corresponding small business entity. The record file includes trade data of the small business, data relating to one or more principals of the small business entity, as well as data relating to one or more guarantors of the small business entity, as appropriate.

36 Claims, 5 Drawing Sheets

U.S. PATENT DOCUMENTS

| | | | |
|---|---|---|---|
| 5,056,019 A * | 10/1991 | Schultz et al. | 705/14 |
| 5,732,400 A | 3/1998 | Mandler et al. | |
| 6,029,149 A | 2/2000 | Dykstra et al. | |
| 6,088,686 A | 7/2000 | Walker et al. | |
| 6,094,643 A | 7/2000 | Anderson et al. | |
| 6,112,190 A | 8/2000 | Fletcher et al. | |
| 6,119,103 A | 9/2000 | Basch et al. | |
| 6,405,175 B1 * | 6/2002 | Ng | 705/14 |
| 7,092,821 B2 * | 8/2006 | Mizrahi et al. | 702/1 |
| 7,162,508 B2 * | 1/2007 | Messina | 709/200 |
| 7,181,518 B1 * | 2/2007 | Matsumoto et al. | 709/224 |
| 2001/0005847 A1 | 6/2001 | Wachtel | |

FOREIGN PATENT DOCUMENTS

| | | |
|---|---|---|
| WO | WO 01/22292 A2 | 3/2001 |
| WO | WO 01-73623 A1 | 10/2001 |
| WO | WO 01/22292 A3 | 3/2003 |

OTHER PUBLICATIONS

European Patent Office Communication dated Dec. 8, 2004 in related EPA 02 802 421.4.

* cited by examiner

SYSTEM AND METHOD FOR FACILITATING RECIPROCATIVE SMALL BUSINESS FINANCIAL INFORMATION EXCHANGES

TECHNICAL FIELD

This invention relates to systems and methods for providing information exchanges among a plurality of member institutions, and, in particular, to providing comprehensive, systematic and accurate information relating to small business entities to the plurality of member institutions.

BACKGROUND OF THE INVENTION

Financial institutions require information regarding business entities in which they invest financial resources. There are well-established methods for obtaining information regarding large business entities. For example, information supplied by Dun & Bradstreet reports are very accurate, and thus financial institutions can make informed risk assessments and financing decisions with respect to large business entities.

However, conventional methods of obtaining information relating to small business entities are haphazard and do not yield accurate information. The lack of a system that can provide accurate information can cause lost economic opportunities for a small business entity that cannot obtain financing under conventional methods and for financial institutions that miss an otherwise viable business growth. A recent survey indicates that twenty-four (24) percent of small and mid-sized business entities are unable to obtain adequate financing. The lack of a system that can provide accurate information can also contribute to a waste of financial resources if a small business entity receives financing based on inaccurate information and then becomes bankrupt.

The financial market for small business entities is huge. The Small Business Administration estimates there are twenty-five (25) million small business entities. Furthermore, the number of new small business entities has been increasing tremendously in recent years as new technologies make it easier for individuals to start new businesses. Numerous people work either independently or with two (2) or three (3) other individuals as consultants, contractors and free lancers. The increased number of small business entities and the lack of a system that can provide accurate information regarding small business entities represent increased risks for financial institutions, as well as an increased number of lost economic opportunities. There is a greater need for a system and method that can provide comprehensive, systematic and accurate information regarding small business entities.

The large number of small business entities implies that any system attempting to provide accurate information needs to be able to manage and update a massive amount of information. The challenge is more complicated because a large portion of small business entities either fail or close. For example, in 1996, there were four hundred forty four thousand six hundred eighty one (444,681) new small business entities having one (1) to four (4) employees. In the same year, three hundred eighty nine thousand three hundred forty two (389,342) small business entities closed or failed. In fact, a turnover rate for small business entities equals approximately twenty (20) to (25) percent per year, which implies a complete turnover of a database storing information relating to small business entities in four (4) or five (5) years. A system attempting to provide comprehensive, systematic and accurate information needs to be able to track and update a tremendous amount of information.

In addition, because an owner of a small business that closed or failed is likely to start another small business entity, a system attempting to provide accurate information regarding small business entities needs to be also be able to provide information relating to the principals of small business entities or other people associated with the business entities, such as board members, executives, and guarantors of loans. A study indicates credit worthiness of a small business entity highly depends on its one or more principals. Accordingly, to be able to make an informed decision regarding a small business entity, information relating to its one or more principals is essential. Furthermore, small business entities often rely on guarantees extended by family members or friends of the owners of the business to obtain initial capital and/or financing required to extend the business. Thus, information relating to one or more guarantors of a small business entity is also critical in assessing credit worthiness of a small business entity. Accordingly, a system attempting to provide comprehensive, systematic and accurate information relating to small business entities needs to be able to provide information relating to the business, as well as one or more principals and guarantors of the business, as appropriate.

Furthermore, a system attempting to provide comprehensive, systematic and accurate information regarding small business entities needs to be able to ramp up fast to include information relating to virtually all small business entities in a given market and their principals and guarantors. The initial hit rate, that is, the percentage of small business entities about which information is requested and found in the system, may be low, for example, about thirty (30) percent. However, the system needs to be able to obtain a high hit rate, approximating, for example, ninety (90) percent, in a relatively short period of time, for example, within nine to twelve months, to attract financial institutions and prove its value to the institutions. If a system attempting to provide information relating to small business entities has a low hit rate, the system would likely be unattractive to financial institutions, and thus, would be unlikely to succeed.

There is a need for a system that can provide comprehensive, systematic and accurate information regarding virtually all small business entities in a given market, which information includes, for each business entity, its trade data and data relating to its one or more principals and guarantors. Such a system can enable financial institutions to make informed assessments of risks involved in providing financing to small business entities. Such a system can also foster new financial products and services for small businesses, thereby satisfying unmet market needs.

SUMMARY OF INVENTION

The present invention provides systems and methods for enabling a small business financial information exchange ("SBFX") that can provide comprehensive, systematic and accurate information to member institutions. The SBFX contains information contributed by member institutions. Each member shares its data relating to small business ("SB") entities in its portfolio. To achieve a high hit rate, about ninety (90) percent, and to include comprehensive information regarding SB entities, the SBFX implements reciprocity and is governed by the bylaws established by the members via its board of directors. In addition, the members own their contributed information, and thus, the members have incentives to share their data relating to SB entities and create a valuable SBFX.

In a preferred embodiment, a reciprocity due to a member is dependent on the member's contributed information to an SBFX repository. A member who contributes a detailed knowledge regarding SB entities in its portfolio can receive detailed information regarding an SB entity that becomes a subject of its inquiry. A member who contributes minimal information regarding SB entities in its portfolio can receive only minimal information relating to an SB entity that becomes a subject of its inquiry even though rich and detailed information regarding the subject of its inquiry may be stored in the SBFX repository. A preferred embodiment of the present invention provides incentives for the members to share its data relating to SB entities.

The reciprocity of the SBFX is implemented by associating each member with a member number and a member profile. The member profile is preferably created when the member joins the exchange. The member profile contains, among other things, information regarding the member organization, the kind of information expected from the member, and a reciprocity due to the member in exchange for the information contributed to the SBFX repository by the member. In addition, an on-going statistical file tracks information contributed by a member and is used to update the reciprocity due to the member.

In general, a mass initial contribution of input information occurs when a member joins the exchange. The initial contribution of input information is preferably processed in a batch mode, using an electronic format or cartridge. However, a member can contribute its input information via a near real-time communication link, such as the Internet and a satellite link. In a preferred embodiment, a contributing member's input data file includes a record trailer that can be used to validate input data processing procedures and to ensure the contributing member's data is correctly accounted.

After the initial load, a member contributes input information, preferably, on a periodic basis, for example, once a month. Each time a member contributes its input information, a statistical analysis of the content of the input information is performed to ensure consistency of reporting by the member and enable an equitable reciprocity for the member. If a member's data contribution increases or decreases, the reciprocity due to the member can be changed as appropriate. The member profile and on-going statistical analyses facilitate sharing of information among the members, thereby enabling a creation of an SBFX that can include useful information relating to virtually all SB entities in a given market. A preferred embodiment of the present invention include information relating to a comprehensive set of SB entities for a given market.

Information relating to each SB entity and stored in an SBFX repository is preferably thorough and detailed. In a preferred embodiment, business trade information, both positive and negative, and comments relating to an SB entity are stored in a record file corresponding to the SB entity. In addition, information relating to one or more principals and to one or more guarantors, where appropriate, is preferably stored in the record file of the SB entity. Furthermore, the record file preferably includes historical data relating to the SB entity, thereby safeguarding against fragmentation and loss of information over time. The historical data relating to the SB can contain, for example, previous trade accounts of the business, as well as previous activities by one or more principals and by one or more guarantors, as appropriate, of the SB entity. The record file preferably also includes member inquiries regarding the corresponding SB entity. The inquiry information can be used to glean business decisions made or attempted by the SB entity, as well as risk assessments a fellow member has made regarding the SB entity. A preferred embodiment provides comprehensive information relating to an SB entity.

Each SB entity in the SBFX repository is preferably associated with a business identifier. Using the business identifier, an entire record file relating to the corresponding SB entity can be retrieved. In addition, key information such as a trade account number and the social security number of a principal of the SB entity can be used to access the corresponding record file. In addition, databases other than the SBFX repository can be linked to provide information in response to a member's query, where appropriate. The present invention provides a way to access comprehensive and systematic information relating to an SB entity. The present invention safeguards against inadvertent fragmentation or loss of information relating to an SB entity.

In general, a member contributes its information using a standard format. However, a member can provide information using a non-standard format. In general, raw data contributed by a member is preprocessed into an internal standard format. The internal standard format is preferably edited before being used to update the SBFX repository or to perform a statistical analysis of the content of the raw data. In a preferred embodiment, various data validations and checks are also performed to ensure high quality of data stored in the SBFX repository. For example, the zip code of an address can be checked against the area code of a telephone number to validate address and telephone information. As another example, one data element, e.g., Date of Last Payment, is checked against another data element, e.g., Date Opened, to ensure logical consistency among different data elements. As a third example, a data element, such as an exception condition, is checked against a tolerance limit which can be based on the contributing member's business rules or the contributing member's historical data. The present invention provides a way to ensure integrity of data stored in the SBFX repository.

A member of the SBFX is eligible to query against the SBFX repository. As an example, a member submits an inquiry transaction regarding an SB entity when the SB entity applies for a credit line. A preferred embodiment achieves approximately a ninety (90) percent hit rate. A member receives a response from the SBFX based on the reciprocity due the member. In general, the response is a masked output of data relating to the SB entity that is the subject of the inquiry and available in the SBFX repository. The amount of masking depends on the reciprocity due to the inquiring member, which reciprocity information is stored in a corresponding member profile. A member can submit an inquiry transaction against the SBFX in a batch or in near real-time transaction mode. In a batch mode, the response from the SBFX is managed and transferred using network data management ("NDM") tools. In near-real time modes, the response from the repository can be a stream of data that needs to be processed by the inquiring member, or a display on the inquiring member's receiving device, such as a PC terminal or a wireless PDA terminal. A response from the SBFX can also be action messages generated using the inquiring member's business rules. Examples of action messages include, among others, "open a credit line for twenty-five thousand (25,000) dollars," "deny the application," or "cross-sell a corporate card."

When a member submits an inquiry transaction that has "no-hit," that is, information relating to an SB entity that is a subject of the inquiry does not exist in the SBFX repository, a new business identifier and a corresponding record file for the SB entity can be generated and stored in the SBFX repository.

Such an addition increases the ability of the SBFX to identify and store information relating to SB entities in a given market.

A filler field in an inquiry transaction is preferably used to generate a control number which can be passed from the beginning to the end of the inquiry process. The control number can be used to facilitate integrity of the SBFX inquiry process. An inquiry transaction and a corresponding response are preferably archived to enable the members to review the SBFX inquiry process and their decision making processes. An archived inquiry transaction or response can be edited and resubmitted.

A preferred embodiment includes a periodic maintenance of the SBFX repository. Certain data is periodically purged to provide cost effective information. In addition, trade data contributed by a leaving member, a member who wishes to end its relationship with the SBFX, is preferably deleted. Furthermore, certain data may be merged and become associated with a new member number, such as when two banks merge into one.

A preferred embodiment of the SBFX complies with the Fair Credit Reporting Act ("FCRA") requirements. In particular, a preferred embodiment of the SBFX provides a disclosure and dispute procedure for an SB entity disputing information supplied by the SBFX. A trained customer service representative handles the disclosure and dispute procedure and verifies the disputed information with the members of the SBFX. A disclosure and dispute procedure can result in a modification of information relating to an SB entity and stored in the SBFX repository.

A preferred embodiment of the SBFX is operational twenty-four (24) hours a day and seven (7) days a week with the exception of scheduled maintenance windows. A preferred embodiment of the SBFX includes redundant components to increase protection against component failures. A preferred embodiment includes a twenty-four (24) hour a day customer help desk.

DETAILED DESCRIPTION

Overview

Figure 1:
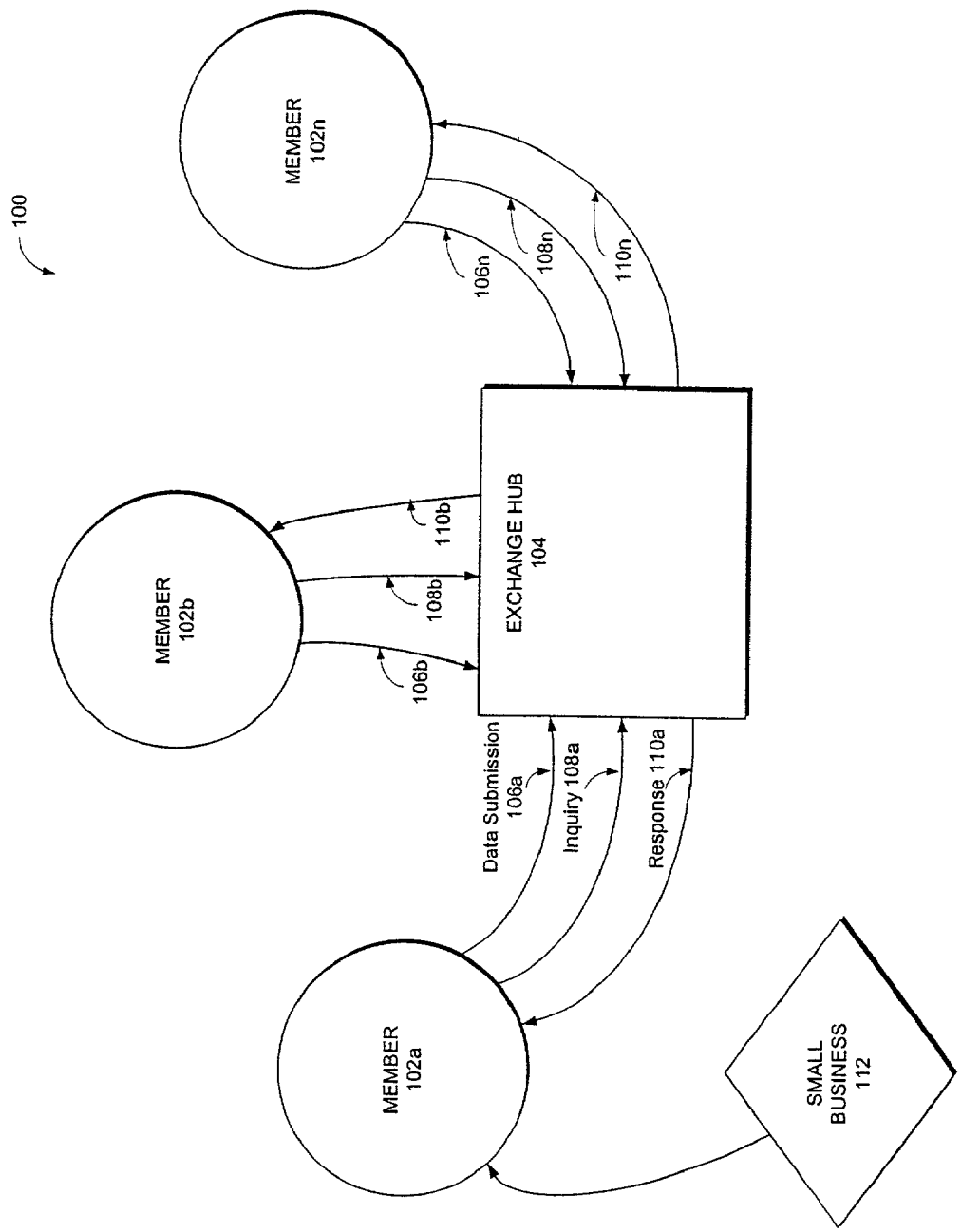
FIG. 1 is an overview of an exemplary embodiment of the small business financial exchange according to the principles of the present invention.

Referring to FIG. 1, an overview of a preferred embodiment of a small business financial exchange according to the principles of the present invention is described. A small business financial exchange (hereinafter "SBFX") 100 interacts with a plurality of exchange members, typically bankers and credit lenders, commonly designated as 102, and includes an exchange hub 104. Each member contributes its data relating to a small business (herein after "SB") entity to the hub 104. FIG. 1 shows an exemplary data submission flow 106a by a member 102a. As an example, when an SB entity 112 requests for a loan to the member 102a, the member posts an inquiry to the exchange hub 104. An example of an inquiry flow to the exchange hub is designated as 108a. In response to a member's inquiry, the exchange hub 104 provides information relating to the SB entity 112. An exemplary response from the exchange hub 104 is designated as 110a. The member 102a uses the response 110a in deciding its financing decision with respect to the SB entity 112. A typical SB entity such as 112 has less than ten (10) million dollars in total revenues, less than two and half (2.5) million dollars in total credit exposure with a member institution, and fewer than twenty (20) employees.

The members of the SBFX own the content of the SBFX repository. The members via their board of directors decide the development and maintenance the SBFX repository. The members also decide via the board of directors how the information stored the SBFX may be used. Rules regarding the SBFX membership and use of the information stored in the SBFX repository are preferably established in the bylaws decided by the board. The members also decide via the board of directors how to ensure an equitable reciprocity (discussed hereinafter) due to each member. The SBFX complies with Fair Credit Reporting Act ("FCRA") requirements, in particular, with respect to disclosure and dispute procedures.

The SBFX is operational twenty-four (24) hours a day and seven (7) days a week with the exception of scheduled maintenance windows. The SBFX includes redundant components to increase protection against component failures. The SBFX can provide an overall reliability rate in the range of ninety-nine (99) percentage. The SBFX includes a twenty-four (24) hour a day customer help desk.

The Exchange Hub

Figure 2:
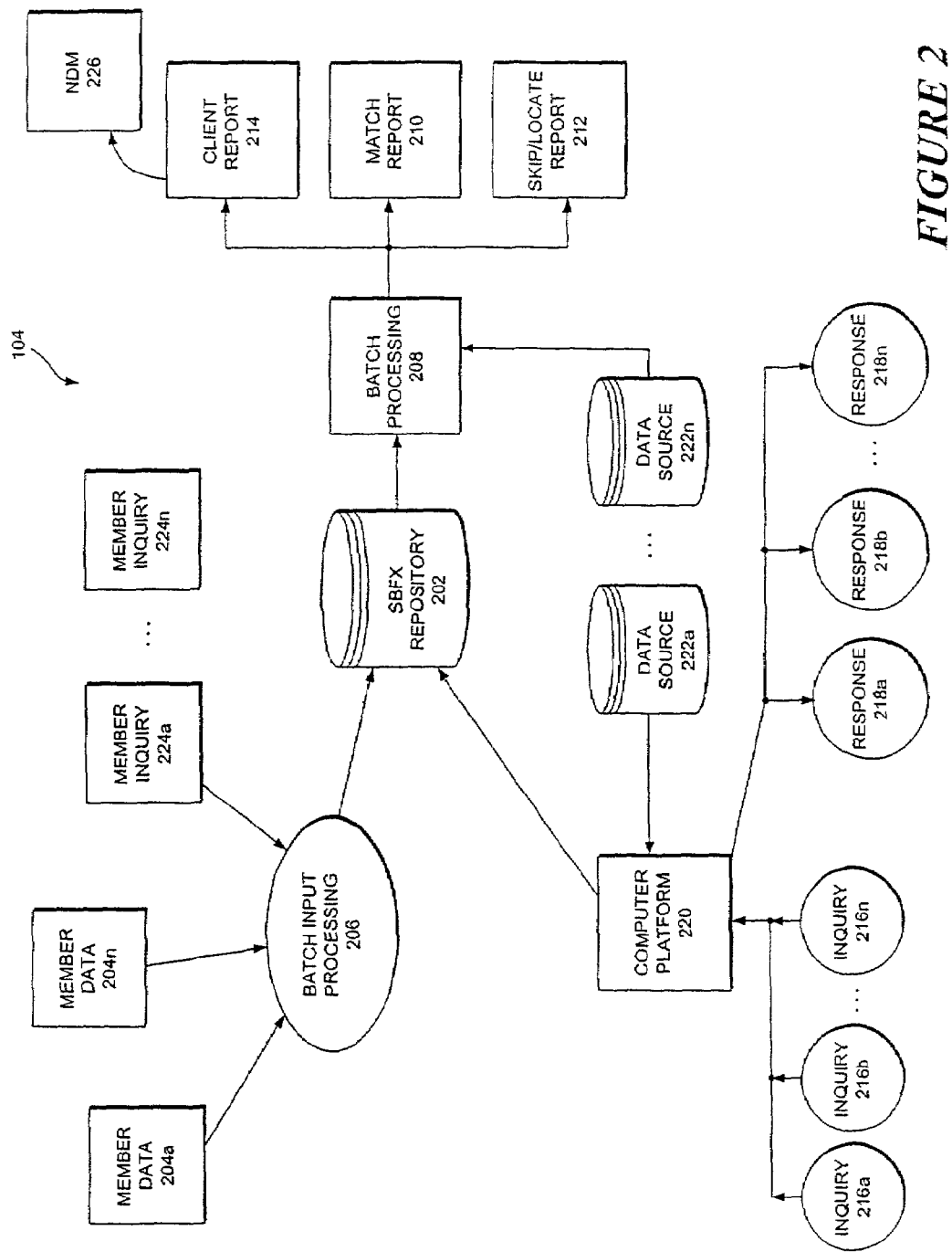
FIG. 2 is an overview of an exemplary embodiment of the exchange hub shown in FIG. 1.

The exchange hub 104 provides a mechanism via which a plurality of exchange members can share their data relating to SB entities and benefit from the SBFX, for example, in assessing a loan risk associated with an SB entity. Referring to FIG. 2, several major components of the exchange hub 104 are described. An SBFX repository 202 is a database which stores data relating to SB entities. A batch input processing engine 206 facilitates a receipt of an input data file contributed in a batch mode by a contributing member. Examples of the batch input processing engine include, among other things, Solaris, OS 390 Oracle, and UNIX operating system. In general, input data files from the members, commonly designated as 204, are processed and edited before being stored into the SBFX repository 202. The members can also submit inquiry transactions, commonly designated as 224, in a batch. A batch processing engine 208 daily processes inquiries and data submitted in a batch mode and generates several reports, including, among other things, a match report 210, a skip/locate report 212, and a client report 214. Reports to a member can be managed and transferred using a standard network data management (NDM) 226 technology.

The exchange hub 104 facilitates a near-real time processing of the members' inquiries, commonly designated as 216. For example, a computer platform 220, such as the next generation operational support system ("NextGen"), receives an inquiry 216a in near real-time. The computer platform 220 accesses the SBFX repository and communicates a response 218a in near real-time. The platform 220 can also receive an input data file from a contributing member in near-real time and communicate a response to the contributing member in real-time.

FIG. 2 illustrates a single database for the SBFX repository 202, but those skilled in the art will understand that the repository can include a plurality of databases. Furthermore, the computer platform 220 and the batch processing engine 208 can access additional data sources, both internal and external, commonly designated as 222. Examples of additional sources includes consumer data, member profiles (discussed hereinafter) and public records. The data sources 222 can be made of several databases. Each of the reports, 210, 212 and 214 can include a plurality of report files. A member's input data and inquiry transactions can be received via various communicational means and/or links, including, among others, cartridges, tapes, CD's, and DVD's, the Internet and a wireless link, such as a satellite link. Similarly, a response to a member's inquiry or a report generated in response to a member's input data file can be transmitted via various communicational means and or links, including, among others, cartridges, tapes, CD's, and DVD's, and via the Internet or a wireless link, such as via a satellite.

The exchange hub 104 utilizes a distributed client and server architecture that allows for development and integration of new components. The architecture uses a "forward moving pipeline," which breaks internal processes into distinct units of work that can be performed simultaneously using multiple instances of the same server processing logic. As the transaction volume increases, the exchange hub can employ additional application server programs to handle the increased load.

Information Regarding a Small Business Entity

The business of lending loans and credit lines to an SB entity requires processing complex information. A record file for an SB entity needs to include not only business trade information but also information relating to one or more principals and one or more guarantors, as appropriate, of the SB entity. While a large percentage of SB entities having one (1) to four (4) employees either close or fail, the owners of SB entities are likely to start another SB entity. An individual who has been an owner of a bankrupt local diner at one time may become a contract salesman for appliances at another time, and then an owner of a thriving copy center. If a database for SB entities only keeps information relating to business trades, valuable information relating to a principal's past business activities and behavior patterns would be lost. Accordingly, a preferred embodiment of a record file for an SB entity tracks not only business-oriented information, but also information relating to its one or more principals. In addition, financial institutions often extend credit to SB entities based on guarantees provided by third-party entities, who are most likely to be natural persons for SB entities, such as friends and family members of the one or more principals. When there exists one or more guarantors, credit worthiness of an SB entity also depends on the credit worthiness of its one or more guarantors. Accordingly, a preferred embodiment of a record file for an SB entity also tracks information relating to one or more guarantors of an SB entity.

Figure 3:
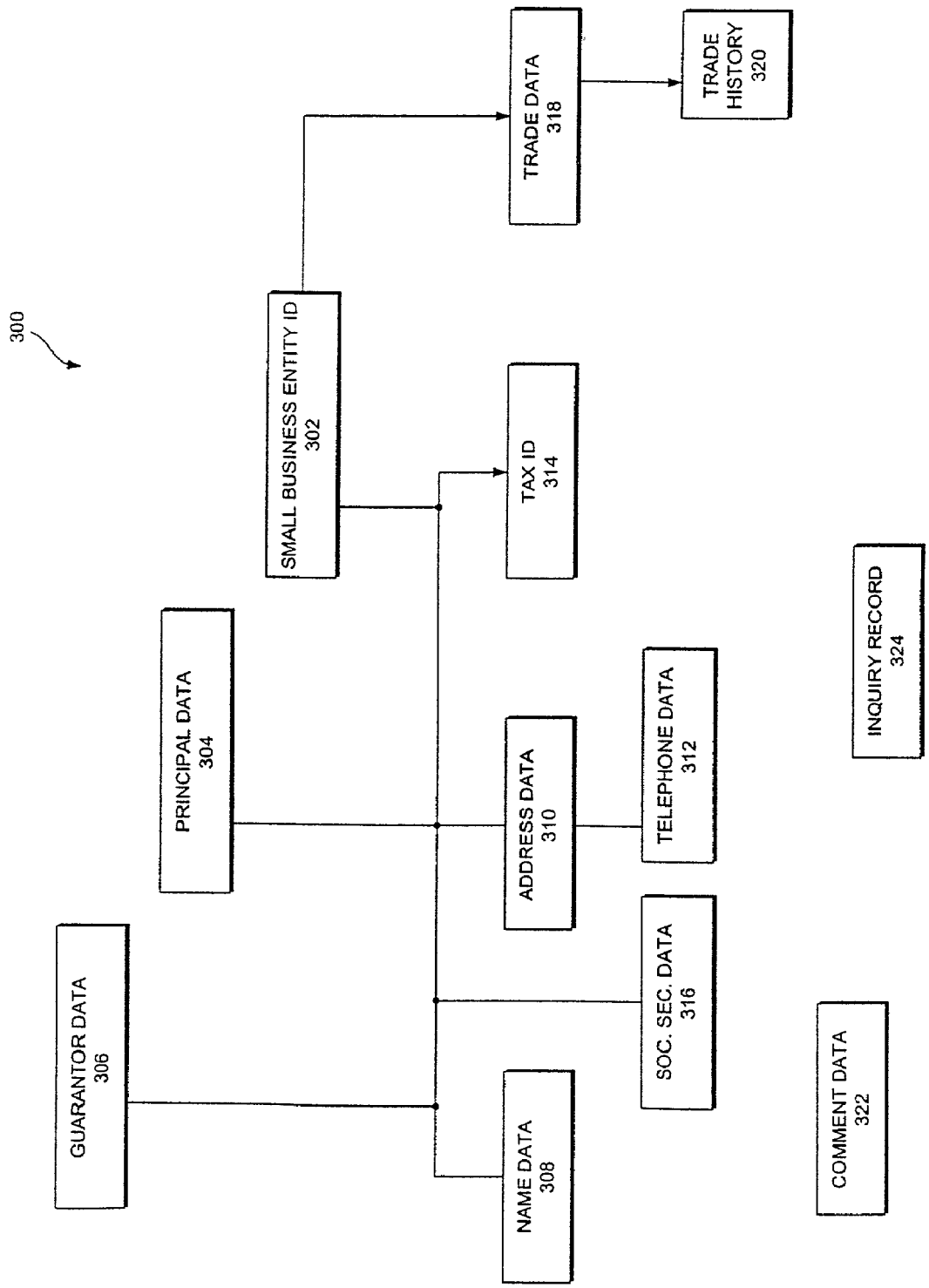
FIG. 3 is an exemplary embodiment of information relating to a small business and stored in an exemplary small business financial exchange repository.

Referring to FIG. 3, a preferred embodiment of an SB record file 300 stored in the SBFX repository 202 is described. The record file 300 includes a plurality of data elements, and each data element contains information relating to an SB entity. The record file 300 includes an SB identifier 302 associated with the SB entity and information relating to its one or more principals 304 and its one or more guarantors 306, if any. The SB record file 300 includes information for the names 308, addresses 310, and telephone numbers 312 of the SB entity, its one or more principals and its one or more guarantors, as appropriate. The record file 300 also includes the tax identification number 314 of the business entity and the social security number 316 of each of the SB entity's one or more principals and guarantors.

The record file 300 includes both positive and negative a trade data file 318, which can include, among other things, account types, key dollar amounts and key dates. The account types can be, among other things, lines of credit, term loans, leases, overdrafts, credit cards and Small Business Administration ("SBA") loans. The key dollar amounts can be, among others, credit limits, balances, and past due aging amounts. The key dates can be, among other things, "date opened," "date of last payment," and "date closed." The record file 300 can also include a trade history file 320, a comment file 322 and an inquiry record file 324. In general, the trade history file 320 is maintained up to twenty-four (24) months and can include prior addresses, telephone numbers, payment history, and past due amounts. A payment history counter includes the number of times an account of the SB entity was past due during prior months. The inquiry record file contains information generated each time a member issues an inquiry against the SBFX repository regarding the SB entity.

The record file 300 includes other identifying information where available, such as a standard industrial classification ("SIC") code, a North American industry classification systems ("NAICS") code, and secondary addresses. The record file 300 can include public record information, such as judgments and liens.

Reciprocity

The SBFX enables participating members to inquire and receive credit related information about SB entities in return for regular contributions of data to the SBFX repository. A significant part of the value of the SBFX depends on the kind and amount of information available on the SBFX. Information stored in the SBFX repository is preferably thorough and detailed and covers virtually all SB in a given market. A financial institution is more likely to join and use the SBFX if the SBFX can provide useful information relating to SB entities that become subjects of its inquiry. Since information stored in the SBFX repository is contributed by the members, the members need to have incentives to contribute their data relating to SB entities. In addition, the desire that may manifest in some members to free-ride the SBFX needs to be curbed and prevented. To achieve a high hit rate and to store detailed and thorough information in the SBFX repository, the SBFX implements reciprocity. Simply stated, the kind of data received by a member regarding an SB entity that becomes a subject of its inquiry corresponds to the kind of data provided by the member regarding SB entities in its portfolio. The reciprocity can also be implemented to depend on, among other things, the volume of records a member contributes the SBFX repository.

Referring to FIG. 2, if a member provides data relating the principals and guarantors, then that member is preferably allowed to access principal and guarantor information provided by other members. If a member chooses not to provide certain data elements, then a response to the member's inquiry does not include those elements even though information may be available in the SBFX repository. A member who consistently contributes minimal information cannot access full information available in the SBFX repository.

In a preferred embodiment, when a member joins the SBFX, a member number and a member profile is created for the member. In addition, an initial mass loading of the member's SB entity portfolio generally occurs. After the member's initial load is successfully updated to the SBFX repository, the member becomes eligible to inquire against the SBFX repository. Following the initial transfer, a member contributes its data periodically, for example, once a month.

The member profile contains the member number and all information relating to the member. The member number is associated with all transactions requested by or carried out on behalf of the member and can be used to control whether certain information is made accessible to the member. A member profile can include, among other things, the name and address, input media type, data format, and other statistical information about the member's organization and its method of contributing data to the SBFX. The member profile also can indicate data elements expected from the member each reporting cycle.

A data element can be, for example, a field within the member's input data indicating a countable kind of information regarding an SB entity that is the subject of the member's input data. For example, the address of a guarantor can be a data element, the social security of a principal can be a data element, and an account number of the SB entity can be a data element. The number of data elements submitted by a member is counted and analyzed to establish a level of reciprocity due for the member.

A member statistic file is preferably produced on a periodic basis. A member statistic file can include, among other things, the total number of the member's input data elements, including the number of times the member submitted an input data file containing a particular data element. In addition, a member statistic file can include information regarding all inquiries submitted and responses received by a member. A member statistic file is produced from a preprocessed and edited input data file (discussed herein after) rather than raw input data files because the editing and preprocessing process can add additional data elements to the file submitted by a member. For example, an incomplete address can be completed during an address standardization process. As another example, certain data elements can be derived from the member's input data file based on the member's business rules. All data submitted by a member, including, among other things, such as required, hard-coded, defaulted values, are counted. However, in general, unless requested by the member, data elements contained in the SBFX and are not reported by a member are not counted toward the member's contribution. In addition, required data elements or defined hard-coded data elements are not generally counted. Hard coded data elements can be determined by several ways, including, for example, a notification by the contributing member, a determination based on a constant value, or a determination based on a member's business rules.

A member's statistical file is compared against the current member profile to determine consistency of the member's data contribution. If a member has increased or decreased the content of the member's data contribution, then the member profile can be updated appropriately. The comparison is preferably performed on a periodic basis, and a member can periodically request a portfolio review. The modification of a member profile can be accomplished either automatically or manually.

The member profile, along with the ongoing statistic file, is the primary vehicle used to implement the reciprocity of the SBFX. The reciprocity can be automated by translating a member's statistics into a scorecard that can be used to automatically restrict the member's access based on the member's score. The members can establish via the board of directors the minimum thresholds for acceptable reporting, as well as a set of business rules for controlling the scorecard.

Data Contribution by the Members

In a preferred embodiment, members' input data files are accepted in an electronic format or cartridge and are provided in one of the two standard formats: a standard SBFX format or an augmented metro 2 format. However, members can submit their data using a non-standard format and provide a cross-reference of the non-standard format to one of the two standard formats. Regardless of the format used by a member, certain data elements, such as the name of the SB entity, certain address information, account number, and account type, are required.

Each standard format submission can include a trailer record containing a record count and a balancing amount field. The record count indicates the number of items, such as types of data and segments, submitted per member input data file. The balancing amount field indicates the total of current balance for all of the member's input data contributions. The trailer record provides capability to verify the complete input file was processed and used to update the SBFX repository.

In general, a member input data contribution can comprise three input data transactional types. The first type is adding an SB entity that was not previously reported. This type of transaction requires a generation of a new SB identifier and a corresponding record file in the SBFX depending on a search and match result. The second type is updating information regarding SB entities already existing in the SBFX repository. The third type includes replacing or correcting information regarding an existing SB record file.

Figure 4:
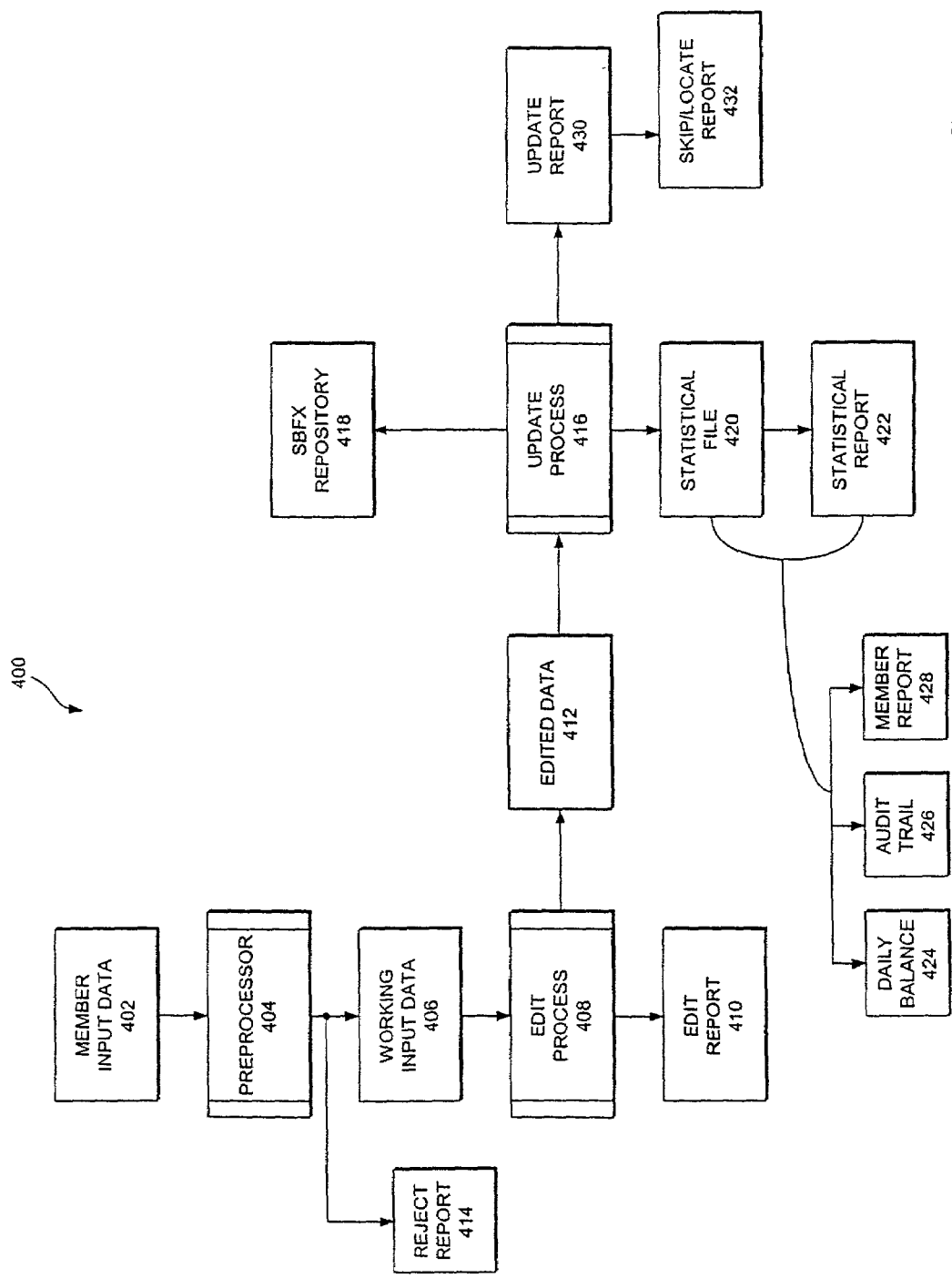
FIG. 4 is an exemplary embodiment of an exchange member's input data contribution process.

Referring to FIG. 4, a member's data contribution process 400 in a batch mode is described. A member forwards an input data file 402 to the SBFX in an electronic format or cartridge. A preprocessor 404 accepts the input data file 402 and reformats it into a common working input data format file 406. The preprocess 404 rejects specific input records that are missing required data elements, or that contain invalid or illogical values. When an input record is rejected, a reject report 414 is updated. The reject report 414 includes details to allow the member submitting the rejected records to understand what correction is required to successfully reprocess those records.

The editing process 408 edits the working input data file 406 according to the SBFX rules developed by the members via their board of directors. For example, the editing process can include a data standardization function to enhance the data match capability of the SBFX. The editing process can include a name standardizing procedure for an SB entity, its one or more principals and guarantors. The editing process can also include address standardizing procedures. In addition, an address and a telephone number can be verified by checking the telephone area code number against the address zip code. The editing process can also perform field-specific validations, inter-field logical integrity checks, and record-to-record evaluation processes. For example, an inter-field validation can detect illogical occurrences: a key date field such as "date opened" can be compared against a field such as "last payment date" to ensure that the last payment date did not occur prior to the date the account was opened. Record-to-record validation ensure that there not a series of records containing the same data content, such as the same social security name or the same balance amount. Accordingly, the editing process 408 helps to ensure the integrity of the SBFX repository.

In addition, a statistical analysis can be performed against historical data file of a member to ensure consistency of reporting based on variance percentage tolerance limits. If the tolerance limits are exceeded for a particular data, the data can be held for manual review prior to being used to update the SBFX repository. For example, if the last cycle current balance total for an SB entity was four (4) million dollars and the current cycle current balance total for the same SB entity is plus or minus ten (10) percent of the four (4) million dollars, the current cycle current balance is manually verified with the data contributing member. Furthermore, actual member input data samples can be collected and stored for historical analysis and reasonableness testing. When allowed thresholds for a particular data element are exceeded, the data can be held for manual review prior to being used to update the SBFX repository. The variance percentage tolerance limits and allowed thresholds for reasonableness testing are preferably tailored to a member's data patterns and/or the member's needs.

The editing process 408 produces an edit report 410 and an edited data file 412. The edit report 410 is used to control and verify the input data process. The edit report 410 can include information the number of input data files received, processed, rejected and submitted per reporting cycle per member. For example, the record trailer in the input data file is used to test the integrity of the input data submission process. The edited data file 412 is used in the updating process 416. Depending on the design of the SBFX repository and key indexes used to access the SBFX repository, the edited data file 412 can be sorted to improve operational efficiencies.

The update process 416 ensures that the edited data file 412 becomes associated with the correct SB identifier, thereby avoiding data fragmentation. For update and replace types of transactions, the correct SB identifier can be located using a combination of the member number of the member submitting the input data file 402, the name of the SB entity and its one or more account numbers contained in the input data file. For an add transaction, the content of the input data file 402 indicates that the member submitting the input data file 402 has a new SB client relationship with the SB entity that is the subject of the input data file 402. The SB entity may or may not already exist in the SBFX repository 418. Accordingly, the update process 416 determines whether the SB entity exists in the SBFX repository 418 using a search and match functionality. If the SB entity does not already exist in the SBFX repository 418, then a new SB identifier is created and information regarding the SB entity is added to the SBFX repository.

The update process 416 also produces, among others, a member statistical file 420, and an associated statistical report 422. The statistical file and report include data to update, among other things, a daily balancing tool 424, an audit trail 426 and a member report 428. The daily balancing tool 424 keeps updated information regarding the SBFX repository. The audit trail 426 includes information that allows a trace of changes to the SBFX repository. The member report 428 includes, among other things, the number of data elements counted to ensure an equitable reciprocity for the member. The statistical file and report, 420 and 422, can be accessed with a standard inquiry tool such as Seagate Crystal Reports.

The update process 416 also produces an update file 430, which can include information relating to the SB entity that is the subject of the member input data 402 A skip and locate report 432 can be also be created. A skip and locate report is created preferably only upon a member's request. For example, a member requests a trigger when an SB entity has an unpaid status. If another member submits a member input data that contains previously unreported information for the same SB entity, a skip and locate report can be generated for the member who requested the trigger.

Repository Access

A member issues inquiries against the SBFX repository to acquire information that can help its decision making process regarding an SB entity. A filler field on a member inquiry transaction is used to generate a control number when the member inquiry transaction is received. The control number is preferably passed from the beginning to the end of the inquiry process to correlate member inquiry transactions to the member inquiry output reports. The control number can also be used as a trace tool in the case of a system discrepancy.

The access to the SBFX is preferably secured by issuing an individual user identifier and password to each authorized user and defining an access level for each user. A member can tailor the type of information returned to specific member users. A preferred embodiment uses a member definition file to facilitate a member to tailor the access level for each of its member users. A member definition file can contain, among other things, contact information, a member number maintenance function and a privilege function. The privilege function allows for a varying degree of access for a user who uses a particular member number. Examples of privileges include "inquiry only," "view the member's own reports only," and/or "view other member's reports." A user can also be granted access to a set of member reports by tailoring the inquiry options presented to the user based on the user's definition and authorization level.

The member number maintenance function can allow a member to configure member account numbers and security digits. A member can define multiple member account numbers, and thus can have the ability to define multiple reports and customize access privileges for each report to specific user communities. For example, each bank branch can have its member account number and reports associated with it. The users in the bank branch can be given access only to the reports associated with its account member number. The member number maintenance function allows the transactional costs to be allocated to the branch. A member can also define custom named reports and specify the products and options that an inquiry can request for in an SBFX response. Users with administrative privileges can access the member number maintenance function.

The SBFX allows several methods of accessing the SBFX repository and benefiting from the membership to the SBFX: a decision power tool, a system-to-system access and a near real-time access.

Access Via the Decision Power Tool

The Decision Power tool automates the risk assessment decision for a member choosing to use the decision power tool. A decision power tool is a custom based tool that incorporates a member's business rules and criteria. A decision power tool for a particular member automates the member's rules and delivers a custom decision message at point-of-sale.

An inquiry output report from a decision power tool can be as simple as "approve" or "decline" messages, or it can provide a tiered set of responses bases on different conditions. A typical action message can be: "open an account with a $25,000 line of credit, cross-sell a corporate card," "issue a corporate card with $10,000 limit only with verification of an identification," or "approve for checking and do not cross-sell."

A decision power tool can also query additional data sources such as consumer credit report databases or public record databases. Furthermore, a decision power tool can be used to cross-sell products and services. A small business owner coming into a bank branch simply to open a checking account can walk out with a credit card and/or a credit line.

System-to-System Access

A system-to-system ("STS") access method enables a member to automate the member's inquiry process. A member can develop a fixed inquiry format and receive an SBFX response as a fixed format data stream. The member can integrate its SBFX inquiry function into the member's own internal systems, such as application and analysis processes. The response from the SBFX repository and/or additional data sources can be directly fed into the member's analysis tools.

Since a STS response is provided in a fixed format data stream, a member using this method needs to programmatically interpret the data stream. This typically requires coding for the data stream. A standard TCP/IP protocol can be used to facilitate the transfer of data between the member's facility and the exchange hub.

Near Real-Time Access

The SBFX allows a near real-time access of the SBFX and additional data sources and services. A member can issue an inquiry against the SBFX repository and receive an SBFX response in near real-time. A member can submits an inquiry via the Internet, using an HTML user interface that allows for the entry of certain inquiry search criteria. The member then receives an SBFX response as an online display. The SBFX response can be printed or stored on a storage device. The SBFX response preferably includes three major components: the business identification and summary, trade and ancillary information. A preferred embodiment via the Internet uses a hundred twenty-eight (128)-bit encryption technique and can deliver a response in less than six (6) seconds.

Exemplary Access

Figure 5:
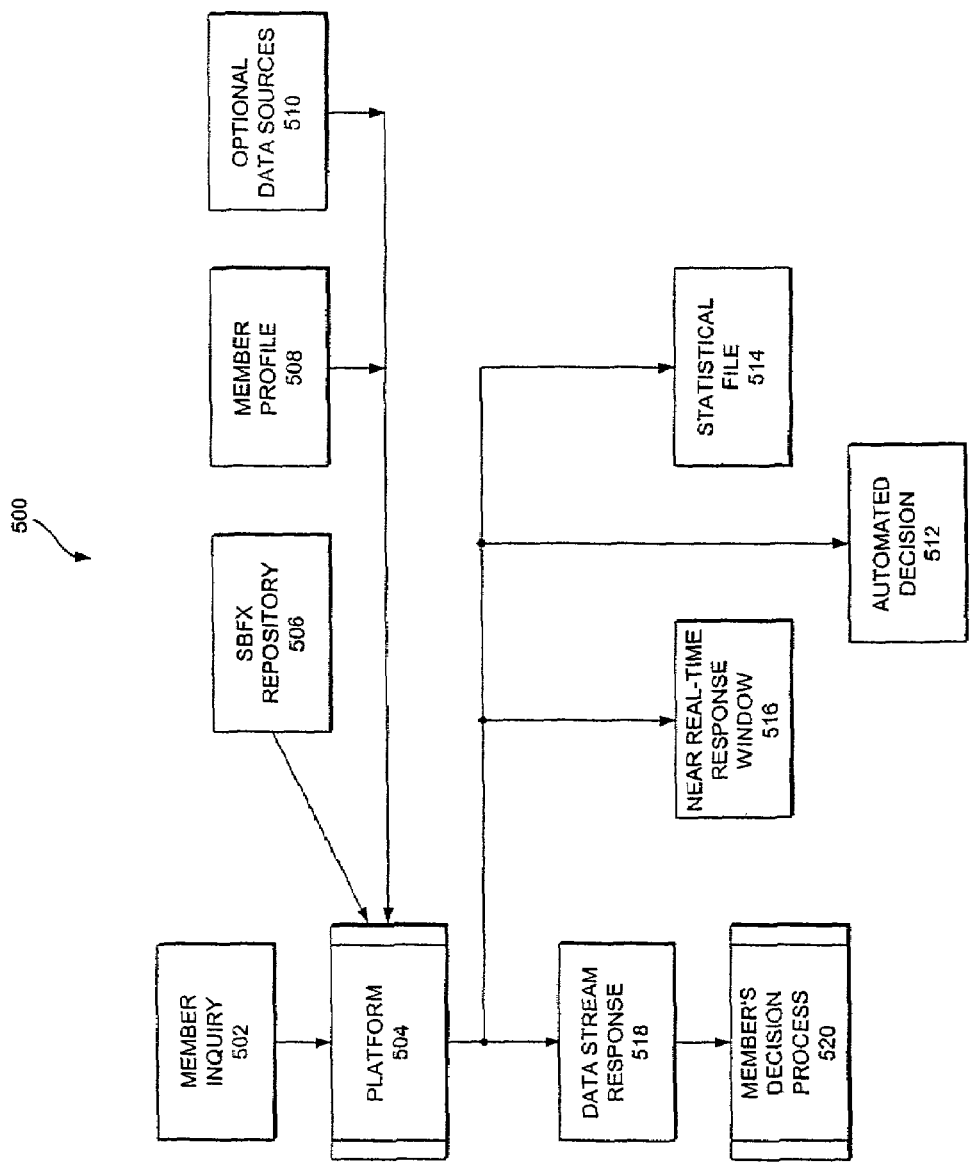
FIG. 5 is an exemplary embodiment of an exchange member's inquiry transaction.

Referring to FIG. 5, an exemplary, on-line SBFX inquiry process 500 is described. In general, an online transaction is single-threaded, originating either from an SBFX or member based software environment. A member submits an inquiry transaction 502. The inquiry transaction 502 can request for information relating to an SB entity. The SB entity may or may not exist in the SBFX repository. The inquiry transaction 502 includes key elements disclosing, for example, the name, address and the tax identification number of the SB entity that is the subject of the inquiry. The key elements are used to search and identify a candidate set. The member inquiry 502 can also include addition information such as telephone numbers and information relating to one or more principals and guarantors of the SB entity. The additional information is used to determine a confidence level of the candidate set. The member inquiry can also specify the type of inquiry requested, which can be, among other things, a member inquiry for risk assessment transaction, a customer service representative ("CSR") inquiry for disclosure, or a CSR inquiry for correction or comment.

A computer platform 504 receives the member inquiry transaction 502. An example of the computer platform 504 is the NextGen. The platform 504 validates the member number contained in the member inquiry transaction 502, formats the inquiry and receives a result form the SBFX repository 506. The platform 504 sends a standard inquiry format to the SBFX repository. The search and match functionality of the SBFX can handle virtually any number of occurrences of key data elements. When multiples SB entities are returned, match qualifiers or alternate indexes are used to determine whether to create a new SB entity or update information regarding an SB entity existing in the SBFX repository. The platform 504 receives a full record relating to an identified SB entity and formats the result from the SBFX repository using a member profile 508 associated with the member number contained in the inquiry transaction 502. The platform 504 masks data elements to which the member associated with the member number is not eligible, thereby achieving the reciprocity of the SBFX.

In certain circumstances, information relating to the SB entity identified by the member inquiry transaction 502 may not exist in the SBFX repository. In such a case, a new SB identifier can be assigned to the SB entity and a corresponding new record file can be entered into the SBFX repository.

The response from the platform 504 can be a standard response report delivered through a near real-time output window 516. An example of such window is a Web-based browser. The response can be an automated decision 512 generated via the decision power tool as described previously. The response can be a data stream 518 that can be fed into a member's decision-making process 520.

The platform 504 can also retrieve data from additional data sources 510, as appropriate. The platform 504 can log the transaction to into a statistical file 514. The statistical file 514 can store all activity related to the online process and can be the same physical database used in a batch inquiry process. In addition, an output file preferably containing transaction counts and balances, statistical analyses and member profile information is generated.

All member inquiry transactions and responses are preferably saved in an archive database. In addition, a report history can be provided to allow a member to query the archive database at a later time and view the archived information. Furthermore, a member can edit a stored inquiry or response and re-submit it as a query to the SBFX.

Disclosure and Dispute Procedures

A disclosure and dispute procedure can process data disputes that can arise in certain circumstances. For example, a trained CSR handles an inquiry from an SB entity that has been denied credit based on information supplied by the SBFX. The initial disclosure and dispute procedure involves disclosing the information relating to the SB entity and provided to the member who denied the credit. The disputing party then has a period of time to dispute the information. When a dispute occurs, a CSR works with exchange members to validate or correct disputed information. Information relating to an SB entity can be deleted manually as a result of dispute or purged systematically based on standard purge rules.

Maintenance

A preferred embodiment of the SBFX includes a periodic maintenance to purge data. Certain data needs to be purged periodically to provide cost effective information to the members. The periodic purge is carried out based on a rule established by the members via the board of directors. In addition, mass maintenance may occur based on certain member activities. For example, if a member leaves the SBFX, a mass delete removes the member's contributed trade data. As another example, if a bank merger occurs, a reassessment of information associated with a member number can occur and the information can become associated with a new member number. Purged information can be archived for a period of time.

The foregoing is provided for purposes of explanation and disclosure of preferred embodiments of the present invention. Further modifications and adaptations to the described embodiments will be apparent to those skilled in the art and may be made without departing from the spirit and scope of the invention and the following claims.

What is claimed is

1. A computer-implemented method for providing information exchanges between at least two members, said at least two members contributing member input information to an exchange repository, comprising:

receiving an input data file from a contributing member, wherein the input data file is received via an electronic communications link, said input data file comprising input content, said input content comprising a plurality of contributed data elements contributed by the contributing member, the plurality of contributed data elements comprising information related to a small business entity and at least one individual associated with the small business entity;

storing the input content in the exchange repository, the exchange repository comprising stored data elements previously received by the exchange repository;

associating the input data file with a business entity identifier, said business entity identifier associating information relating to the small business entity and the at least one individual associated with the small business entity;

creating a member profile for the contributing member, said member profile comprising a statistics file, the statistics file comprising:

statistics based on a content type and number of the plurality of contributed data elements; and statistics based on inquires previously received from the contributing member and responses previously provided to the contributing member;

determining a score for the statistics file by comparing the statistics based on the content type and number of the plurality of contributed data elements and the statistics based on inquiries previously received from the contributing member and responses previously provided to the contributing member to a threshold;

determining the contributing member's access to the exchange repository to receive a content type and number of the stored data elements in the exchange repository based, at least in part, on the score; and providing at least one of the stored data elements to the contributing member based on the determined contributing member's access.

2. The computer-implemented method of claim 1, wherein associating the input data file with the business entity identifier includes associating information relating to a guarantor of the business entity with the business entity identifier.

3. The computer-implemented method of claim 1, further comprising associating the member profile with a member number, said member number identifying information relating to the contributing member.

4. The computer-implemented method of claim 1, comprising:

generating the statistical file for the contributing member, said statistical file containing statistical data relating to the input content.

5. The computer-implemented method of claim 4, wherein the statistical file is used to determine data due to the contributing member.

6. The computer-implemented method of claim 1, wherein determining the score for the statistics file by comparing the statistics based on the content type and number of the plurality of contributed data elements and the statistics based on inquiries previously received from the contributing member and responses previously provided to the contributing member to a threshold comprises comparing the statistics based on the content type and number of the plurality of data elements to the member profile to determine consistency of the type and number of contributed data elements.

7. The computer-implemented method of claim 1, comprising:

preprocessing the input data file to a standard working input data file; and editing the standard working input data file.

8. The computer-implemented method of claim 1, wherein creating the member profile for the member contributing the input data file comprises:

an address standardization process; and a name standardization process.

9. The computer-implemented method of claim 1, comprising an editing process, said editing process checking an area code of a telephone number against a zip code of an address.

10. The computer-implemented method of claim 1, comprising an editing process, said editing process evaluating information contained in a first contributed data element against information contained in another data element.

11. The computer-implemented method of claim 1, comprising a data validating process, said data validating process checking the number of occurrences of an exception condition against a tolerance limit.

12. The computer-implemented method of claim 11, wherein the tolerance limit depends on a content provided in a previous input data file of the contributing member.

13. The computer-implemented method of claim 11, wherein the tolerance limit depends on the contributing member's business rule.

14. The computer-implemented method of claim 1, comprising a data validating process, said data validating process checking information in a contributed data element against a stored data element provided in a previous input file associated with the contributing member.

15. The computer-implemented method of claim 14, wherein a history file stores information relating to the contributing member's previous input information.

16. The computer-implemented method of claim 1, wherein receiving the input data file from a contributing member comprises receiving the input data file comprising a trailer record to facilitate a verification of an input data contribution process.

17. The computer-implemented method of claim 1, comprising:

generating a skip and locate report based on the exchange repository content and in response to a trigger.

18. The computer-implemented method of claim 1, comprising:

producing a trail record file for facilitating a trace of changes to the exchange repository.

19. The computer-implemented method of claim 1, comprising:

keeping track of changes to the exchange repository.

20. The computer-implemented method of claim 1, comprising:

keeping track of updates to the information stored in the exchange repository.

21. The computer-implemented method of claim 1, comprising:

producing a member report keeping track of a count relating to the input content, said count being used to determine data due to the contributing member.

22. The computer-implemented method of claim 1, wherein the member profile keeps said score for the contributing member, said score being used to automatically restrict an access to the exchange repository by the contributing member.

23. The computer-implemented method of claim 1, comprising:

deleting member input trade information contributed by a leaving member, said leaving member being one of the at least two members who decides to end its membership to a small business financial exchange comprising the exchange repository.

24. The computer-implemented method of claim 1, comprising:
purging periodically a set of information stored in the exchange repository.

25. The computer-implemented method of claim 1, comprising:
modifying information relating to a business entity in view of a result from a disclosure and dispute procedure.

26. The computer-implemented method of claim 25, comprising:
associating a portion of information stored in the exchange repository with a new member number.

27. A computer-implemented method for providing information exchanges between at least two members, said at least two members contributing member input information to an exchange repository, comprising:
receiving an input data file from a contributing member, wherein the input data file is received via an electronic communications link, said input data file comprising input content, said input content comprising a plurality of contributed data elements contributed by the contributing member, the plurality of contributed data elements comprising information related to a small business entity and at least one individual associated with the small business entity;
storing the input content in the exchange repository, the exchange repository comprising stored data elements previously received by the exchange repository;
associating the input data file with a business entity identifier, said business entity identifier associating information relating to the small business entity and the at least one individual associated with the business entity;
generating a statistical file based on the input content, said statistical file comprising:
statistics based on a content type and number of the plurality of contributed data elements; and
statistics based on inquires previously received from the contributing member and responses previously provided to the contributing member;
determining a score for the statistics by comparing the statistics based on the content type and number of the plurality of contributed data elements and the statistics based on inquiries previously received from the contributing member and responses previously provided to the contributing member to a threshold;
determining the contributing member's access to the exchange repository to receive a content type and number of the stored data elements in the exchange repository based, at least in part, on the score; and
providing at least one of the stored data elements to the contributing member based on the determined contributing member's access.

28. The computer-implemented method of claim 27, wherein associating the input data file with the business entity identifier includes associating information relating to a guarantor of the business entity with the business entity identifier.

29. The computer-implemented method of claim 27, wherein determining the score for the statistics by comparing the statistics based on the content type and number of the plurality of contributed data elements and the statistics based on inquiries previously received from the contributing member and responses previously provided to the contributing member to the threshold comprises comparing the statistics based on the content type and number of the plurality of data elements to a member profile to determine consistency of the type and number of contributed data elements.

30. The computer-implemented method of claim 27, comprising:
updating a member profile associated with the contributing member in view of the statistical file.

31. The computer-implemented method of claim 27, wherein associating the input data file with the business entity identifier comprises associating information relating to trade data of the business entity and at least one inquiry issued by at least one of the at least two members.

32. The computer-implemented method of claim 1, further comprising:
generating the statistics file on a periodic basis.

33. The computer-implemented method of claim 27, wherein generating the statistical file based on the input content comprises generating the statistical file on a periodic basis.

34. The computer-implemented method of claim 1, wherein the information relating to the small business entity and at least one individual associated with the small business entity comprises data on trade accounts.

35. The computer-implemented method of claim 34, wherein the data on trade accounts comprises at least one of:
account type;
dollar amounts;
date of trade account;
Small Business Administration loans;
payment history; or
prior address.

36. The computer-implemented method of claim 27, wherein the information relating to the small business entity and at least one individual associated with the small business entity comprises a risk assessment.

* * * * *